(12) United States Patent
Sakazaki

(10) Patent No.: US 10,434,720 B2
(45) Date of Patent: Oct. 8, 2019

(54) BONDING METHOD AND DEVICE

(71) Applicant: FUJIFILM Corporation, Tokyo (JP)

(72) Inventor: Yoshiki Sakazaki, Kanagawa (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 418 days.

(21) Appl. No.: 15/095,295

(22) Filed: Apr. 11, 2016

(65) Prior Publication Data

US 2016/0221253 A1    Aug. 4, 2016

Related U.S. Application Data

(63) Continuation of application No. PCT/JP2014/077152, filed on Oct. 10, 2014.

(30) Foreign Application Priority Data

Oct. 22, 2013 (JP) .................. 2013-218928

(51) Int. Cl.
   *B29C 65/48* (2006.01)
   *B29C 65/00* (2006.01)
   (Continued)

(52) U.S. Cl.
   CPC .............. *B29C 65/48* (2013.01); *B29C 65/18* (2013.01); *B29C 66/006* (2013.01);
   (Continued)

(58) Field of Classification Search
   CPC ................ A61J 1/10; B32B 2307/558; B32B 2307/7242; B32B 2439/70; B29C 65/18;
   (Continued)

(56) References Cited

U.S. PATENT DOCUMENTS

| 5,034,074 A | 7/1991 | Thomas, Jr. |
| 5,103,618 A * | 4/1992 | Garwood ................ B65B 7/168 |
| | | 53/433 |

(Continued)

FOREIGN PATENT DOCUMENTS

| CN | 1053775 A | 8/1991 |
| FR | 2 481 641 A1 | 11/1981 |

(Continued)

OTHER PUBLICATIONS

Communication dated Jan. 4, 2017, from State Intellectual Property Office of the P.R.C. in counterpart application No. 201480058211.9.

(Continued)

*Primary Examiner* — Philip C Tucker
*Assistant Examiner* — Vicki Wu
(74) *Attorney, Agent, or Firm* — Sughrue Mion, PLLC

(57) ABSTRACT

A bonding target object and a film including a layer having lower toughness than the bonding target object are disposed between a set of pressurization molds, which have pressurization surfaces disposed so as to face each other and in which opening holes are formed in the pressurization surfaces. A first edge on the opening hole side of the pressurization surface of a first pressurization mold, out of the set of pressurization molds, which faces the film is positioned further inside the opening hole than a second edge on the opening hole side of the pressurization surface of a second pressurization mold which faces the bonding target object. The pressing target portion of the film which is pressed by the set of pressurization molds is bonded to the bonding target object by sandwiching the bonding target object and the film with the set of pressurization molds to be pressed.

14 Claims, 12 Drawing Sheets

(51) Int. Cl.
*B29C 65/18* (2006.01)
*A61J 1/10* (2006.01)
*B29C 65/50* (2006.01)
*B29L 31/00* (2006.01)

(52) U.S. Cl.
CPC .... *B29C 66/1122* (2013.01); *B29C 66/24244* (2013.01); *B29C 66/43* (2013.01); *B29C 66/723* (2013.01); *B29C 66/8322* (2013.01); *A61J 1/10* (2013.01); *B29C 65/4815* (2013.01); *B29C 65/4835* (2013.01); *B29C 65/5057* (2013.01); *B29L 2031/7148* (2013.01); *B32B 2307/558* (2013.01); *B32B 2307/7242* (2013.01); *B32B 2439/70* (2013.01)

(58) Field of Classification Search
CPC ............ B29C 65/4815; B29C 65/4835; B29C 65/5057; B29C 66/006; B29C 66/1122; B29C 66/24244; B29C 66/8322; B29C 66/723; B29C 65/48; B29L 2031/7148
USPC .......................................................... 156/245
See application file for complete search history.

(56) References Cited

U.S. PATENT DOCUMENTS

| | | | | |
|---|---|---|---|---|
| 5,629,060 A | * | 5/1997 | Garwood | ................ B65B 7/168 |
| | | | | 156/292 |
| 7,205,016 B2 | * | 4/2007 | Garwood | ................ A23B 4/10 |
| | | | | 426/108 |
| 2004/0236025 A1 | * | 11/2004 | DeKunder | .......... B29C 49/0005 |
| | | | | 525/240 |
| 2005/0175741 A1 | * | 8/2005 | Reinders | ................ B65D 21/08 |
| | | | | 426/106 |
| 2011/0240641 A1 | * | 10/2011 | Huels | ...................... B29C 65/18 |
| | | | | 220/200 |

FOREIGN PATENT DOCUMENTS

| | | | | |
|---|---|---|---|---|
| JP | 02-131910 U | | 11/1990 | |
| JP | 6-171616 A | | 6/1994 | |
| JP | 07024916 A | * | 1/1995 | ............ B29C 65/18 |
| JP | 11-56970 A | | 3/1999 | |
| JP | 11-348171 A | | 12/1999 | |
| JP | 2001-269389 A | | 10/2001 | |
| JP | 2004-231199 A | | 8/2004 | |
| JP | 2005060517 A | * | 3/2005 | |
| JP | 2007-217019 A | | 8/2007 | |
| WO | 2009/122655 A1 | | 10/2009 | |

OTHER PUBLICATIONS

Communication dated Aug. 16, 2017, from the European Patent Office in counterpart Application No. 14 856 703.5.
Written Opinion of PCT/JP2014/077152 dated Dec. 22, 2014.
International Search Report of PCT/JP2014/077152 dated Dec. 22, 2014.
Communication dated Sep. 20, 2016 from the European Patent Office in counterpart Application No. 14856703.5.

* cited by examiner

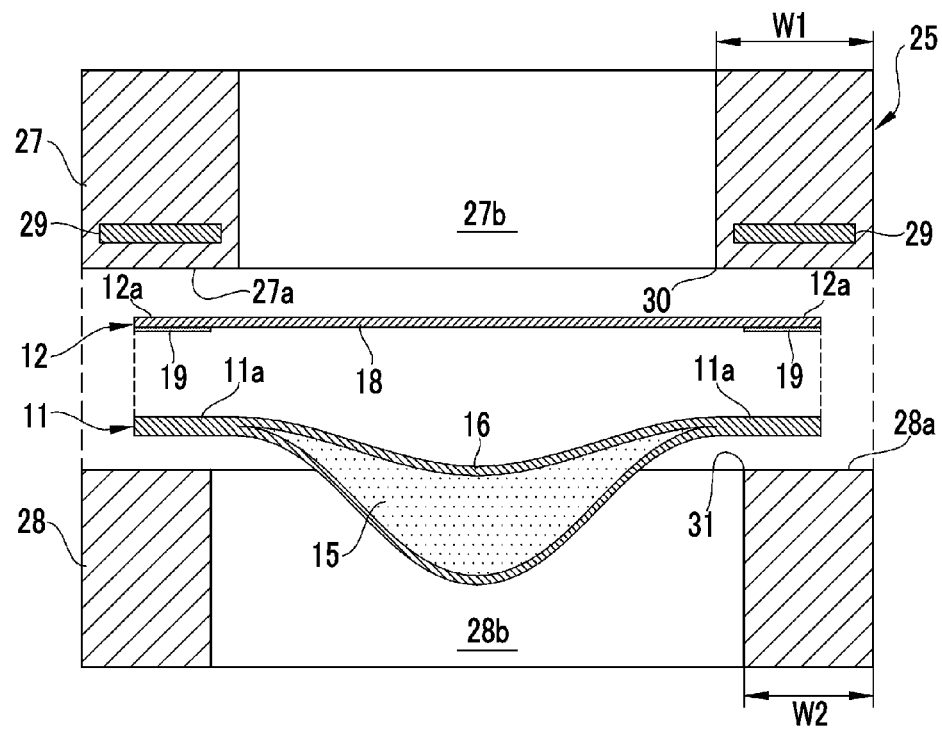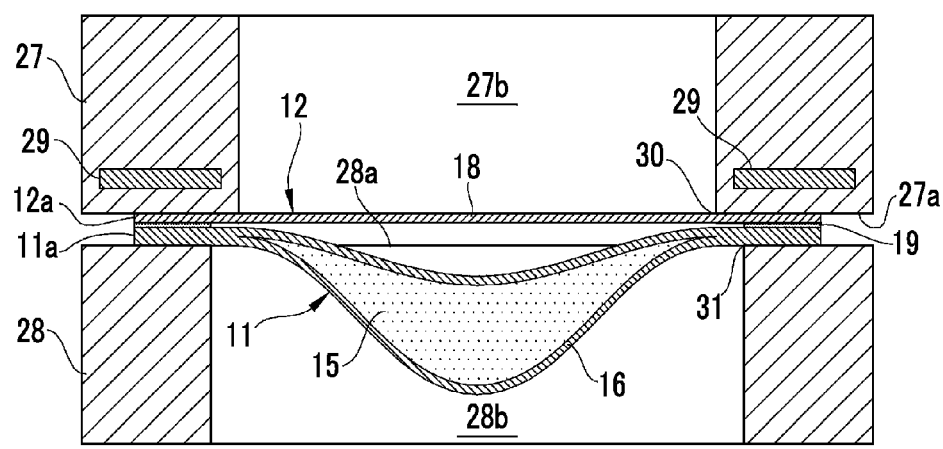

FIG. 12
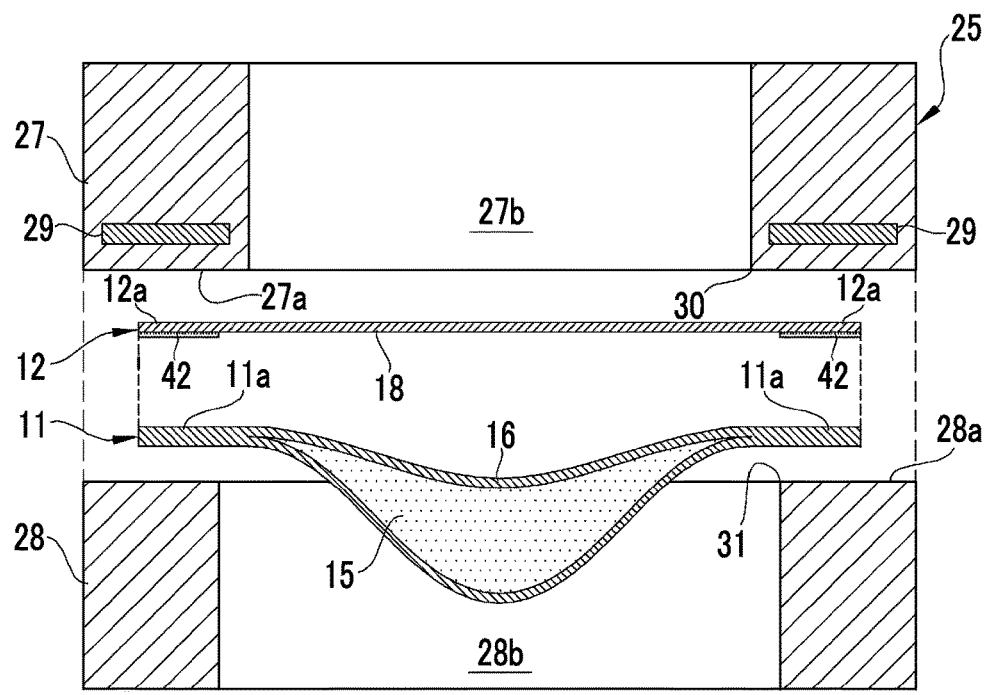
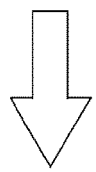
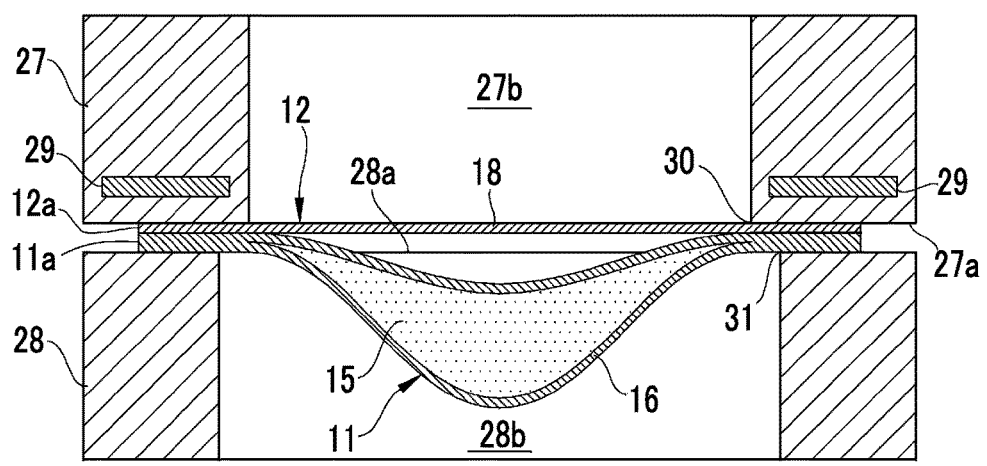

BONDING METHOD AND DEVICE

CROSS-REFERENCE TO RELATED APPLICATIONS

The present application is a Continuation of PCT International Application No. PCT/JP2014/077152 filed on Oct. 10, 2014 claiming priority under 35 U.S.C § 119 to Japanese Patent Application No. 2013-218928 filed on Oct. 22, 2013. The above application is hereby expressly incorporated by reference, in their entirety, into the present application.

BACKGROUND OF THE INVENTION

1. Field of the Invention

The present invention relates to a bonding method and device for bonding a film to an object to be welded.

2. Description of the Related Art

In general, a liquid medicine, a powder medicine, food, powder (sugar or the like) which is weak to humidity, an inspection chip which detects specific gas, and the like are packaged in a packaging container. As a kind of such a packaging container, for example, a transfusion bag filled with a transfusion containing sugar, an electrolyte, amino acids, vitamins, or the like is well known. A transfusion bag is formed of a resin film (plastic film) or the like in view of good handling properties, being lightweight, reduction in volume of waste, or the like.

The resin film used as a material of the transfusion bag has low gas barrier properties since an additive, which improves gas barrier properties, is used in an additive-free manner in order to prevent such an additive from being injected into a human body after being eluted in the transfusion. Here, it is easy for liquid medicines, such as sugar, amino acids, or an electrolyte, with which the transfusion bag is filled to significantly deteriorate due to entering of oxygen. Therefore, if the transfusion bag is left to stand in the air, the liquid medicine deteriorates due to oxygen in the air transmitted through the transfusion bag.

In a transfusion bag disclosed in JP1999-56970A (JP-H11-56970A), a periphery portion of a protection sheet is bonded to a periphery portion of a front surface of a bag main body formed of a resin film or the like, and a periphery portion of a cover sheet is bonded to a periphery portion of a rear surface of the bag main body. The protection sheet or the cover sheet includes a function layer having gas barrier properties, and therefore, the gas barrier properties of the transfusion bag are secured. The periphery portion of the protection sheet or the cover sheet is bonded to the bag main body by performing heating and pressing using a pressurization mold which has a pressurization surface with a frame shape corresponding to the shape of the periphery portion.

In a transfusion bag disclosed in JP1999-348171A (JP-H11-348171A), similarly to JP1999-56970A (JP-H11-56970A), gas barrier properties are secured by thermally welding a periphery portion of a gas barrier film, which has a gas barrier function layer, to periphery portions of both surfaces of the bag main body formed of a resin film or the like.

In JP2004-231199A, gas barrier properties of a transfusion bag are secured by storing the transfusion bag formed of a resin film or the like in a transfusion bag-storing external packaging bag with gas barrier properties.

SUMMARY OF THE INVENTION

However, in JP1999-56970A (JP-H11-56970A) and JP1999-348171A (JP-H11-348171A), when bonding the periphery portion of the protection sheet or the periphery portion of the gas barrier film to the bag main body, this periphery portion is pressed by the frame-like pressurization surface of a pressurization mold. However, the toughness of the gas barrier function layer included in the protection sheet or the like is lower than that of the bag main body, that is, brittle destruction is easily caused in the gas barrier function layer. For this reason, there is a concern that deformation in the gas barrier function layer may be caused in the vicinity of the edge of the pressurization surface through the pressing using the frame-like pressurization surface, thereby causing destruction.

In the transfusion bag disclosed in JP2004-231199A, it is necessary to store the transfusion bag in the transfusion bag-storing external packaging bag. Therefore, there is more labor for taking out the transfusion bag from the transfusion bag-storing external packaging bag in a medical institution. In addition, there is a problem that there is more waste. For this reason, it is desirable that the gas barrier protection sheet or film is bonded to the bag main body through welding, adhering, or the like.

An object of the present invention is to provide a bonding method and device which can prevent destruction of a layer with low toughness when bonding a film containing the layer with low toughness to a bonding target object.

A bonding method for achieving an object of the present invention, is a bonding method for bonding a pressing target portion of a film which is pressed by a set of pressurization molds to a bonding target object by disposing the bonding target object and the film including a layer having lower toughness than the bonding target object between the set of pressurization molds, which have pressurization surfaces disposed so as to face each other and in which opening holes are formed in the pressurization surfaces, and by sandwiching the bonding target object and the film with the set of pressurization molds to be pressed, the method including: bonding the pressing target portion to the bonding target object using the set of pressurization molds having a configuration in which a first edge on the opening hole side of the pressurization surface of a first pressurization mold, out of the set of pressurization molds, which faces the film is positioned further inside the opening hole than a second edge on the opening hole side of the pressurization surface of a second pressurization mold which faces the bonding target object.

According to the present invention, deformation of the film caused by the first edge or remaining of a mark of the first edge in the film is prevented when bonding the film to the bonding target object using the set of pressurization molds.

It is preferable that the pressing of the film is performed using the first pressurization mold in which the first edge is chamfered. Accordingly, it is possible to reliably prevent the destruction of the layer, which has low toughness, of the film.

It is preferable that an adhesive layer is formed on a surface side of the pressing target portion facing the bonding target object, and the set of pressurization molds bonds the pressing target portion to the bonding target object through the adhesive layer. It is possible to bond the film to the bonding target object through adhering.

It is preferable that the set of pressurization molds bonds the pressing target portion to the bonding target object through welding. It is possible to bond the film to the bonding target object through welding.

It is preferable that the pressing target portion of the film is bonded to one surface side of the bonding target object, and then, a pressing target portion of a bending resistant function film, which is positioned on the other surface side of the bonding target object and has higher bending resistance than the film, is bonded to the bonding target object by disposing the bonding target object and the bending resistant function film between the set of pressurization molds, and sandwiching the bonding target object and the bending resistant function film with the set of pressurization molds to press the bending resistant function film on the one surface side of the bonding target object using the first pressurization mold and to press the bending resistant function film using the second pressurization mold. When bonding the bending resistant function film to the other side of the bonding target object, destruction of a layer, which has low toughness, of the film on the one surface side of the bonding target object is prevented.

It is preferable that the pressing target portion of the film is bonded to one surface side of the bonding target object using the set of pressurization molds in a state in which the film is suppressed not to swell more than a bending resistant function film having higher bending resistance than the film, after bonding the bending resistant function film to the other surface side of the bonding target object. In a case where bonding target objects, to which the film is bonded, are various containers, the bending resistant function film is bonded to the bonding target objects without destruction of the layer, which has low toughness, of the film by securing a volume of the content of the containers by causing the bending resistant function film to swell.

It is preferable that at least one of the first pressurization mold and the second pressurization mold is formed of any of metal, a rubber material, a resin material, a ceramic material, and wood.

It is preferable that at least the first pressurization mold out of the first pressurization mold and the second pressurization mold performs pressing of the film using a pressurization surface having releasability with respect to the film. Accordingly, it is possible to easily release the film from the pressurization surface after the pressing of the film using the first pressurization mold (also including the second pressurization mold in a case where the pressurization surface of the second pressurization mold has releasability).

It is preferable that the pressurization surface of at least the first pressurization mold out of the first pressurization mold and the second pressurization mold presses the film through tape which is stuck to the pressurization surface or a sheet provided between the pressurization surface and the film. Accordingly, it is possible to easily release the film from the pressurization surface after the pressing of the film using the first pressurization mold (the second pressurization mold can also be used).

It is preferable that an edge line of the first edge which forms a contour of the opening hole of the first pressurization mold is formed to have a smoothly connected shape and an edge line of the second edge which forms a contour of the opening hole of the second pressurization mold is formed to have a smoothly connected shape. Accordingly, it is possible to reliably prevent the destruction of the layer, which has low toughness, of the film.

It is preferable that the bonding target object and the film are sandwiched with the set of pressurization molds, which have the pressurization surfaces formed in a frame shape and the opening holes which are surrounded by the pressurization surfaces, to be pressed. Accordingly, it is possible to seal one surface of the bonding target object using the film.

A bonding device for achieving an object of the present invention is a bonding device which bonds a pressing target portion of a film which is pressed by a set of pressurization molds by disposing a bonding target object and a film including a layer having lower toughness than the bonding target object between the set of pressurization molds, which have pressurization surfaces disposed so as to face each other and in which opening holes are formed in the pressurization surfaces, and by sandwiching the bonding target object and the film with the set of pressurization molds to be pressed, in which a first edge on the opening hole side of the pressurization surface of a first pressurization mold, out of the set of pressurization molds, which faces the film is positioned further inside the opening hole than a second edge on the opening hole side of the pressurization surface of a second pressurization mold which faces the bonding target object.

The bonding method and device of the present invention can prevent destruction of a layer with low toughness when bonding a film including the layer with low toughness to a bonding target object.

BRIEF DESCRIPTION OF THE DRAWINGS

FIG. 3 is an explanatory view for illustrating a state a gas barrier function film and a bag main body is sandwiched with the first pressurization mold and the second pressurization mold to be pressed.

FIG. 4 is an explanatory view for illustrating a state in which the gas barrier function film and the bag main body are sandwiched with the first pressurization mold and the second pressurization mold to be pressed.

FIG. 12 is an explanatory view for illustrating still another embodiment in which a gas barrier function film is bonded to a bag main body through welding.

DESCRIPTION OF THE PREFERRED EMBODIMENTS

[Overall Configuration of Transfusion Bag]

Figure 1:
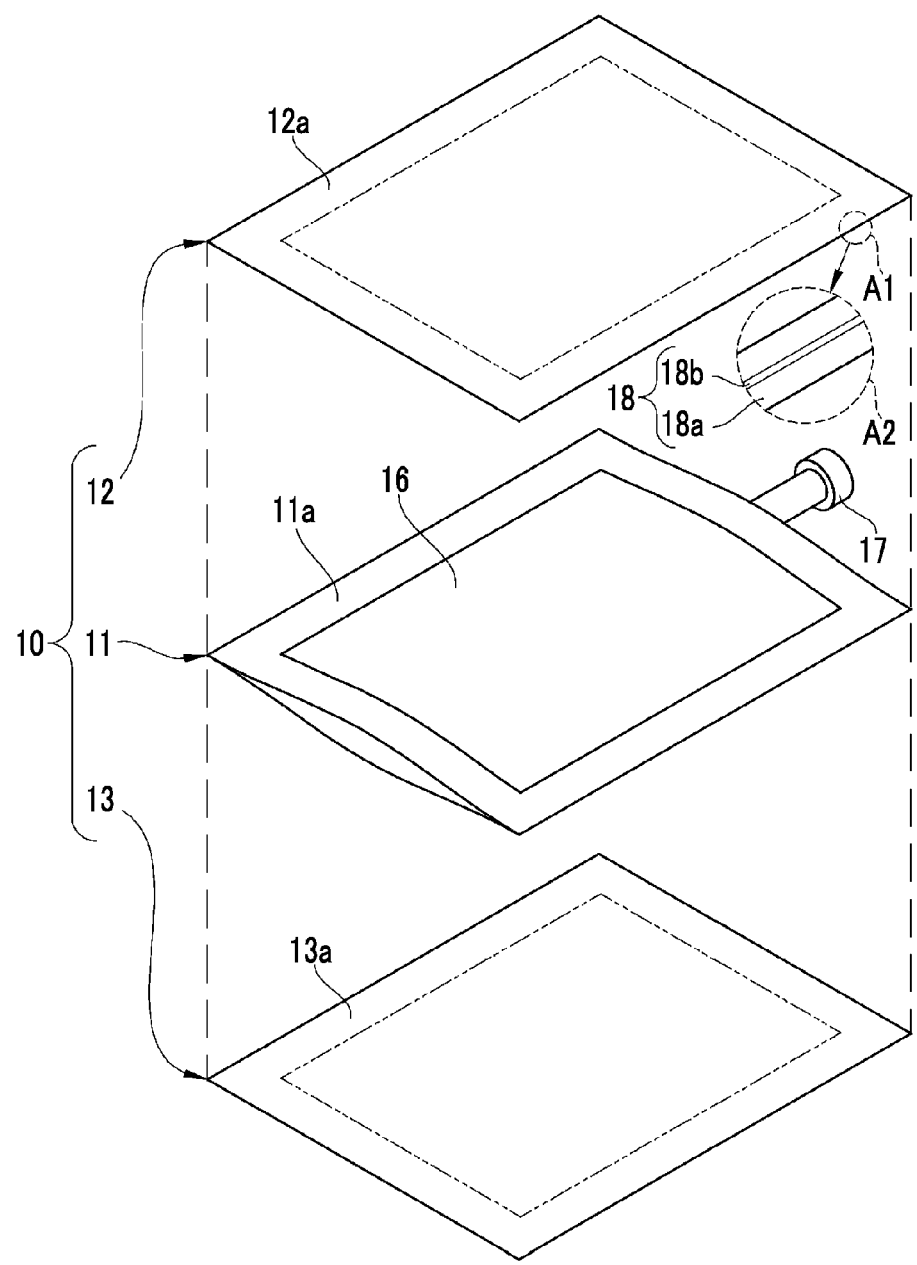
FIG. 1 is an exploded perspective view of a transfusion bag.

A transfusion bag 10 as shown in FIG. 1 is constituted of, in rough classification, a bag main body (bonding target object) 11, a gas barrier function film (film) 12, and a bending resistant function film 13.

The bag main body 11 is formed by, for example, sealing four sides in a state in which a flexible function film is folded, or in a state in which two flexible function films are made to overlap each other. A liquid medicine chamber 16, which is filled with a transfusion 15 (refer to FIG. 3) and is sealed, is formed in the bag main body 11 by sealing four sides of a main body periphery portion 11a. In addition, a cylindrical mouth portion 17 which communicates with the inside of the liquid medicine chamber 16 is integrally provided in one end portion in the bag main body 11 through welding or the like. Although is not shown in the drawing, an opening hole of the mouth portion 17 is sealed by a mouth plug.

The gas barrier function film 12 is bonded to one surface side (here, upper surface side in the drawing) of the bag main body 11 through adhering. More specifically, a film periphery portion 12a (for example, a region between a two-dot chain line and the outer circumference) of the gas barrier function film 12 is adhered to the one surface side of the main body periphery portion 11a of the bag main body 11 so as to surround the liquid medicine chamber 16. This gas barrier function film 12 has a film main body 18 which includes a base material film layer 18a and a sealing function layer (layer with low toughness) 18b constituted of a single layer or multiple layers; and an adhesive layer 19 (refer to FIG. 3) which can be adhered to the bag main body 11. A reference numeral A2 in the drawing displays an enlarged dotted-line display portion A1 of the gas barrier function film 12.

The sealing function layer 18b is, for example, a deposition layer of an inorganic oxide formed on the base material film layer 18a, and has gas barrier properties with respect to gas such as oxygen and moisture barrier properties with respect to moisture or the like. However, the sealing function layer has toughness lower than that of the resin film of the bag main body 11. That is, the sealing function layer 18b is formed of a brittle material. For this reason, brittle destruction is more easily caused in the sealing function layer 18b than in the bag main body 11. In addition, the adhesive layer 19 is adhered to an object to be adhered (here, bag main body 11) by being cooled and solidified or being thermally hardened as it is after being melted at a certain temperature or above.

The type and structure of the gas barrier function film 12 are not particularly limited, and any well-known film having gas barrier properties can be used.

The bending resistant function film 13 is bonded to the other surface side (here, lower surface side in the drawing) of the bag main body 11 through adhering. More specifically, a film periphery portion 13a (for example, a region between a two-dot chain line and the outer circumference) of the bending resistant function film 13 is adhered to the main body periphery portion 11a on the other surface side of the bag main body 11 so as to surround the liquid medicine chamber 16. The bending resistant function film 13 has a film main body 20 (refer to FIG. 8) including a base material film layer (not shown in the drawing), an aluminum layer (not shown in the drawing), and the like; and an adhesive layer 21 (refer to FIG. 8) which can be adhered to the bag main body 11. This bending resistant function film 13 has gas barrier properties and moisture barrier properties, and is more excellent in bending resistance than the gas barrier function film 12. In addition, the adhesive layer 21 is basically the same as the above-described adhesive layer 19.

The type and structure of the bending resistant function film 13 are not particularly limited, and various films which have gas barrier properties and are excellent in bending resistance can be used.

[Production of Transfusion Bag]

<Bonding of Gas Barrier Function Film>

Figure 2:
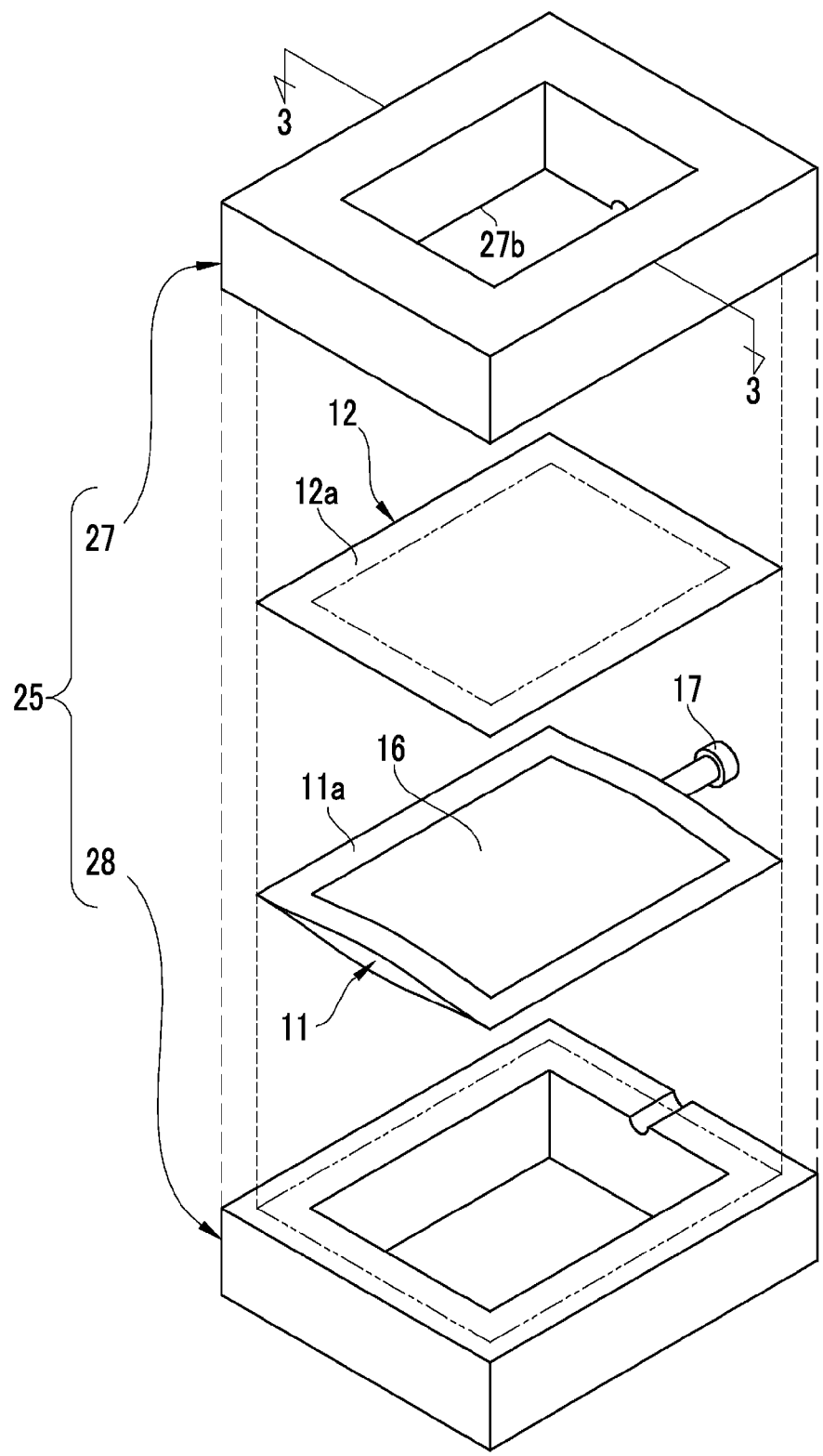
FIG. 2 is a perspective view of a first pressurization mold and a second pressurization mold (a set of pressurization molds).

As shown in FIGS. 2 and 3, the gas barrier function film 12 is bonded to one surface side of the bag main body 11 through adhering using a set of pressurization molds (also called metal molds) 25 constituting the bonding device of the present invention. In the present embodiment, the gas barrier function film 12 is bonded to the bag main body 11 after being filled with the transfusion 15, but the gas barrier function film 12 may be bonded to the bag main body 11 before being filled with the transfusion 15.

A set of pressurization molds 25 bonds the gas barrier function film 12 to the bag main body 11 by sandwiching the bag main body 11 and the gas barrier function film 12 to be pressed. This set of pressurization molds 25 is constituted of a first pressurization mold 27 formed of metal and a second pressurization mold 28 formed of flexible or hard rubber. In addition, a heating unit 29 such as a heater which heats the first pressurization mold 27 is incorporated in the first pressurization mold 27. The heating unit 29 may be provided in the second pressurization mold 28 or both in the first pressurization mold 27 and the second pressurization mold 28.

The first pressurization mold 27 and the second pressurization mold 28 respectively have a first pressurization surface 27a and a second pressurization surface 28a which have a frame shape (that is, a shape corresponding to a four-side sealed portion surrounding the liquid medicine chamber 16 of the bag main body 11) and face each other. The first pressurization surface 27a presses the gas barrier function film 12. The second pressurization surface 28a presses the bag main body 11.

A rectangular first opening hole (also called a cavity) 27b surrounded by the first pressurization surface 27a is opened in the first pressurization surface 27a and a rectangular second opening hole 28b surrounded by the second pressurization surface 28a is opened in the second pressurization surface 28a. The first and second opening holes 27b and 28b respectively correspond to opening holes of the present invention. Moreover, the first edge 30 on the first opening hole 27b side of the first pressurization surface 27a is formed so as to be positioned further inside the first opening hole 27b and the second opening hole 28b (hereinafter, called inside of the opening) than the second edge 31 on the second opening hole 28b side of the second pressurization surface 28a.

Specifically, the outer shapes of the first pressurization surface 27a and the second pressurization surface 28a are formed to have the same size as each other. In addition, the width W1 of one side of the first pressurization surface 27a is formed to 5 mm and the width W2 of one side of the second pressurization surface 28a is formed to 4 mm. Accordingly, the first pressurization surface 27a is formed to be wider than the second pressurization surface 28*a* by 1 mm toward the inside of the opening, and therefore, the first edge 30 is positioned further inside the opening than the second edge 31 by 1 mm.

The bag main body 11 and the gas barrier function film 12 are set in a state in which the bag main body and the gas barrier function film overlap each other between the first pressurization mold 27 and the second pressurization mold 28. At this time, the gas barrier function film 12 is set on a surface side facing the first pressurization mold 27 and the bag main body 11 is set on a surface side facing the second pressurization mold 28. In addition, the gas barrier function film 12 is overlapped at a predetermined bonding position on one surface side of the bag main body 11 such that the adhesive layer 19 comes into contact with the main body periphery portion 11*a* of the bag main body 11. The adhesive layer 19 may be provided in a frame shape on the other surface side of a pressing target portion which is sandwiched between the first pressurization surface 27*a* and the second pressurization surface 28*a* of the film periphery portion 12*a* (hereinafter, also simply called a pressing target portion) to be pressed.

As shown in FIG. 4, the gas barrier function film 12 and the bag main body 11 are sandwiched by the first pressurization mold 27 and the second pressurization mold 28 which have been heated by the heating unit 29, to be pressed. Accordingly, the film periphery portion 12*a* is pressed by the first pressurization surface 27*a* toward the main body periphery portion 11*a*, and the main body periphery portion 11*a* is pressed by the second pressurization surface 28*a* toward the film periphery portion 12*a*. Then, the adhesive layer 19 is melt through heating using the first pressurization mold 27, and the pressing target portion of the film periphery portion 12*a* (portion formed on the adhesive layer 19) is bonded to the main body periphery portion 11*a* through adhering.

The pressing using the first pressurization mold 27 and the second pressurization mold 28 is released after the lapse of a predetermined time for pressing. Here, the bonding of the gas barrier function film 12 to one surface side of the bag main body 11 has been completed. Accordingly, a space for preventing oxygen or the like from entering the bag main body 11 is formed on the one surface side of the bag main body 11. At this time, in the present embodiment, the first edge 30 is positioned further inside the opening than the second edge 31. Therefore, destruction of the sealing function layer 18*b* of the gas barrier function film 12 caused by the pressing using the first pressurization mold 27 is prevented.

<Reason why Destruction of Sealing Function Layer is Prevented>

Figure 5:
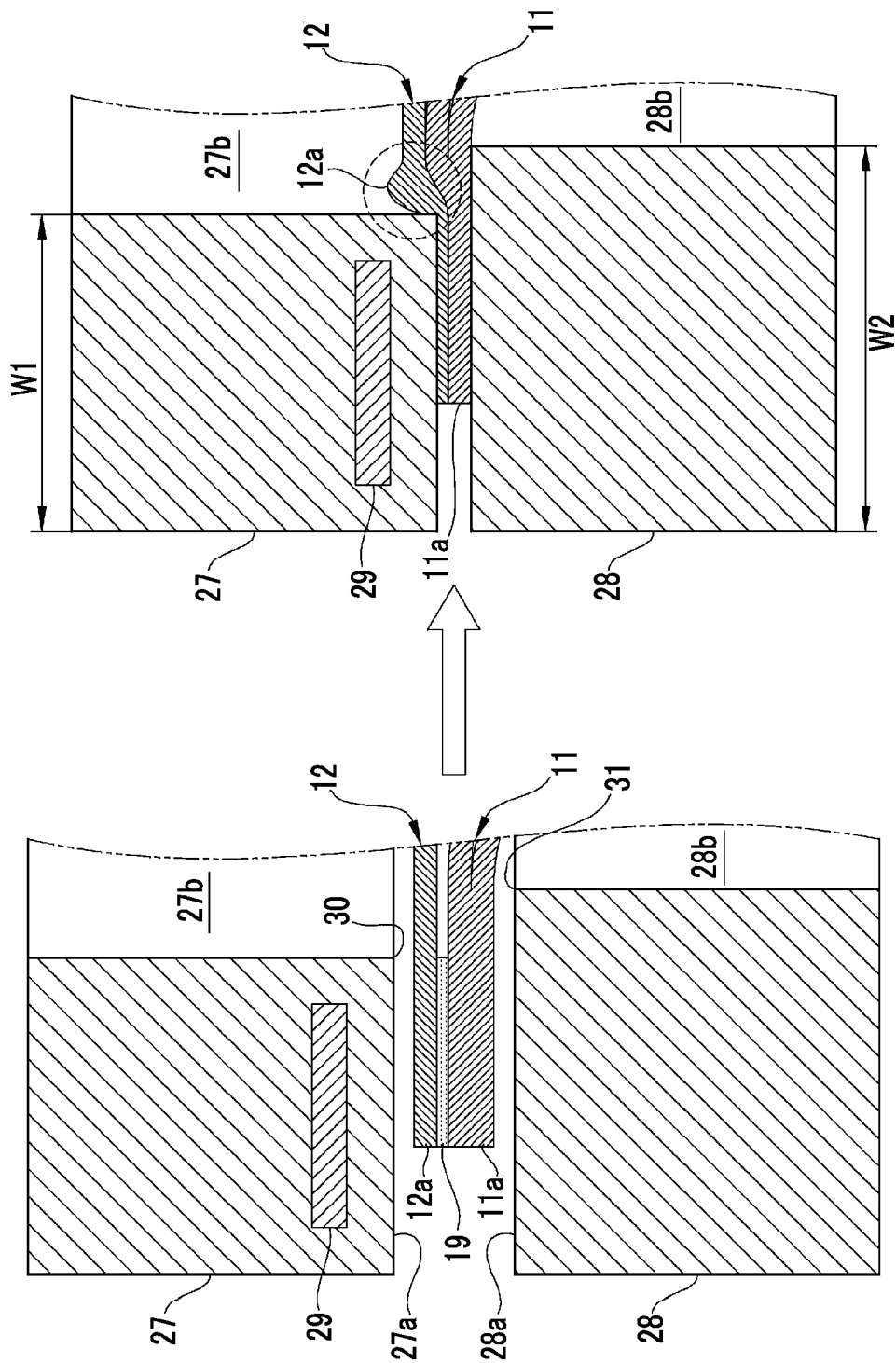
FIG. 5 is an explanatory view for illustrating Comparative Example in which a second edge is positioned inside an opening hole than a first edge.

In contrast, in FIG. 5 showing Comparative Example, in a case where the second edge 31 is positioned further inside the opening than the first edge 30 (W1<W2), a force in a direction in which the film periphery portion 12*a* in the vicinity of the first edge 30 is deformed to the back side (upward in the drawing) of the first opening hole 27*b* is concentrated due to the pressing performed using the first pressurization mold 27 and the second pressurization mold 28. Accordingly, the film periphery portion 12*a* in the vicinity of the first edge 30 is steeply bent and deformed (refer to a portion surrounded by a dotted line in the drawing) so as to swell toward the back side of the first opening hole 27*b*. As a result, destruction is caused in the sealing function layer 18*b* of the gas barrier function film 12.

Figure 6:
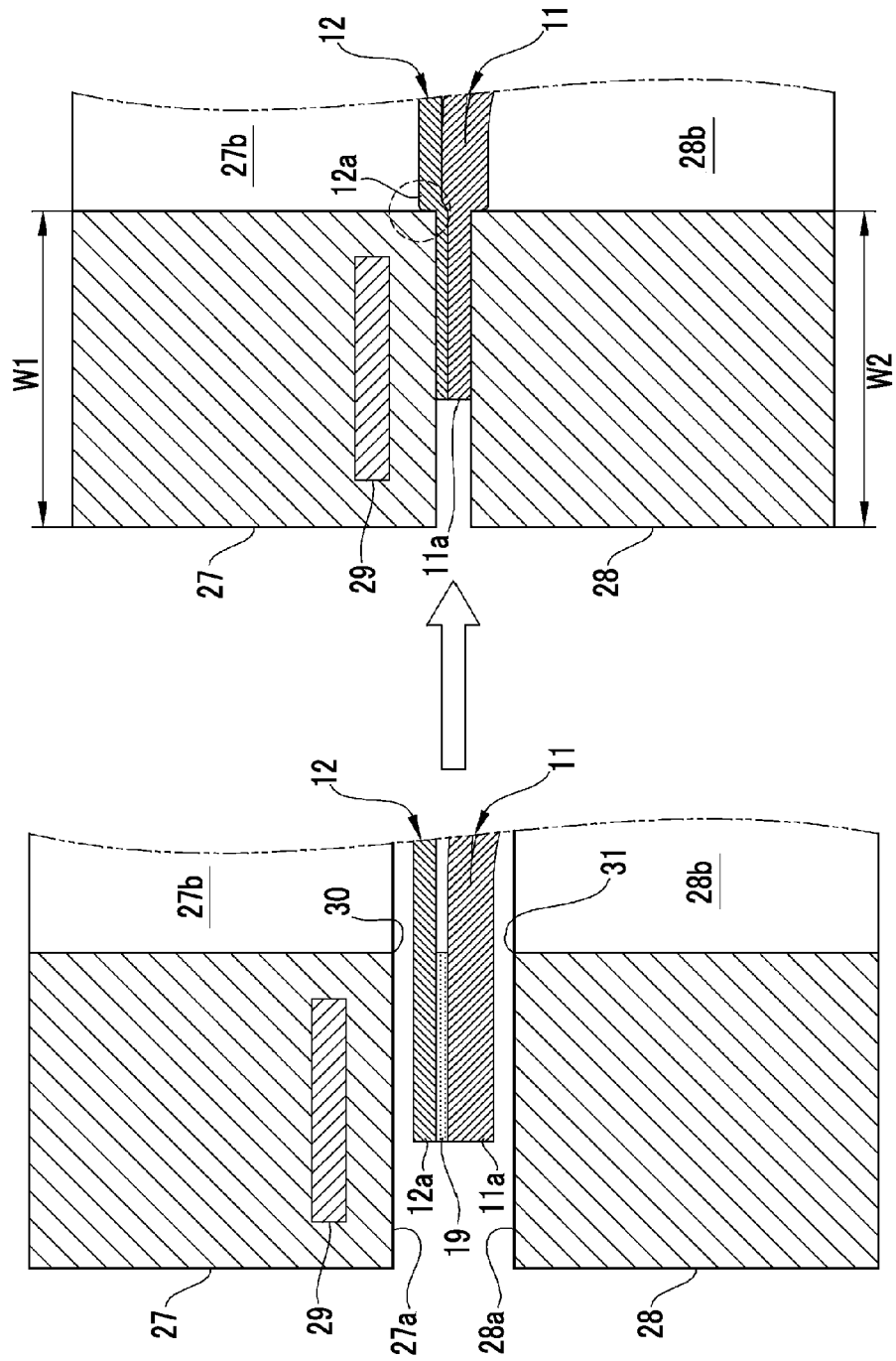
FIG. 6 is an explanatory view for illustrating Comparative Example in which a first edge and a second edge are at the same position as each other.

In addition, in FIG. 6 shown in Comparative Example, even in a case where the first edge 30 and the second edge 31 are at the same position as each other (W1=W2), if a slight deviation of the contact position is caused during the pressing using the first pressurization mold 27 and the second pressurization mold 28, there is a possibility that the second edge 31 may be positioned further inside the opening than the first edge 30. In addition, even in a case where the first edge 30 and the second edge 31 are designed to be at the same position as each other, there is a possibility that the second edge 31 may be positioned further inside the opening than the first edge 30 due to the difference in processing accuracy of the first pressurization mold 27 and the second pressurization mold 28. For this reason, in a case where the second edge 31 is positioned further inside the opening than the first edge 30 due to the deviation of the contact position or the difference in the processing accuracy, deformation and destruction of the sealing function layer 18*b* (the portion surrounded by a dotted line in the drawing) of the gas barrier function film 12 are caused as shown in FIG. 5.

Figure 7:
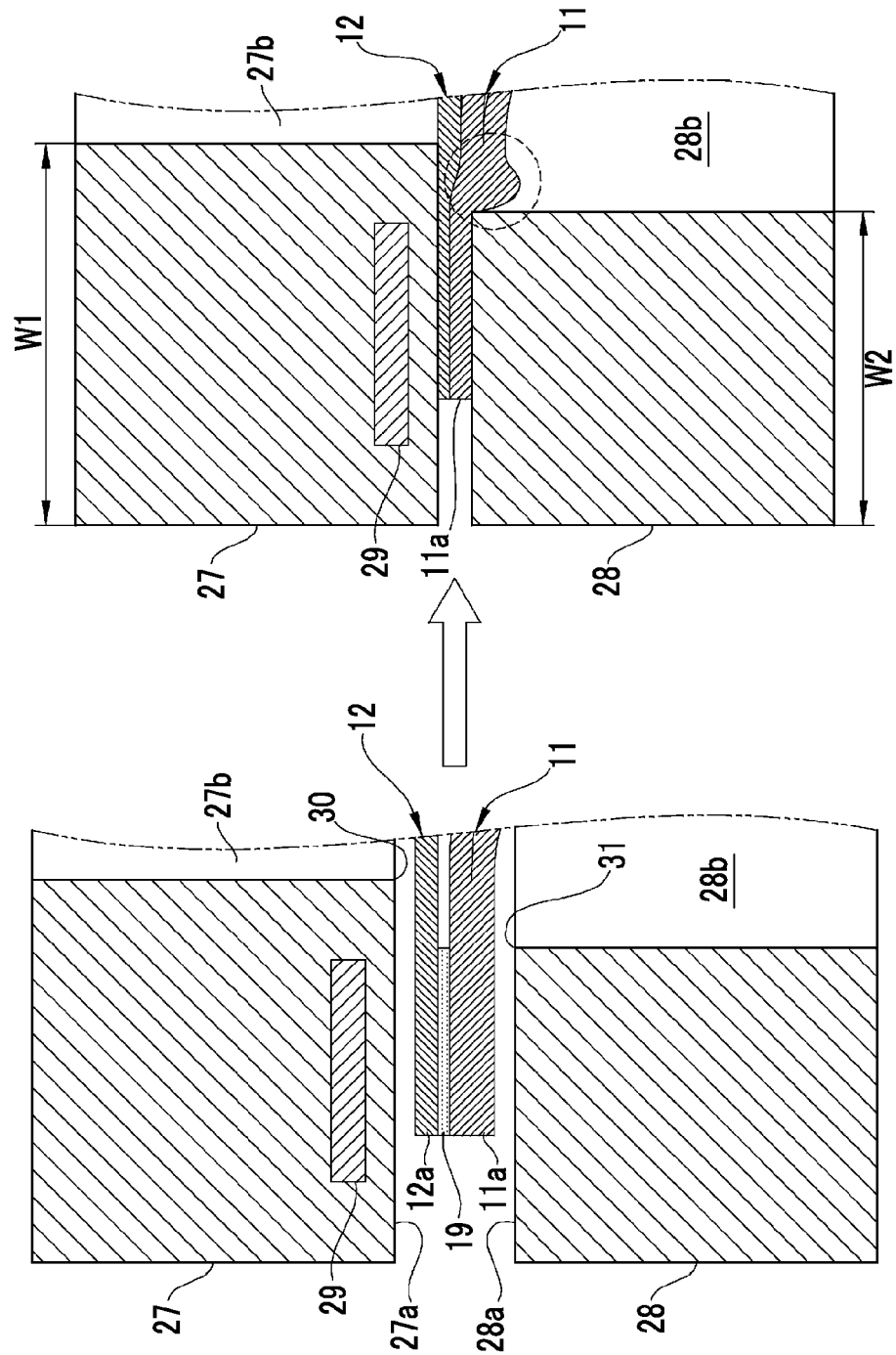
FIG. 7 is an explanatory view for illustrating the reason why destruction of a sealing function layer of a gas barrier function film is prevented.

With respect to such Comparative Example, in the present invention, the first edge 30 is positioned further inside the opening than the second edge 31 (W1<W2) as shown in FIG. 7. For this reason, a force in a direction in which the main body periphery portion 11*a* in the vicinity of the first edge 30 is deformed to the back side (downward in the drawing) of the second opening hole 28*b* is concentrated due to the pressing using the first pressurization mold 27 and the second pressurization mold 28 contrary to Comparative Example shown in FIG. 5. Accordingly, the main body periphery portion 11*a* in the vicinity of the first edge 30 is deformed (refer to a portion surrounded by a dotted line in the drawing) so as to swell toward the back side of the second opening hole 28*b*. As a result, steep bending and deformation which result in destruction of the sealing function layer 18*b* caused by the first edge 30 is prevented from being caused in the gas barrier function film 12, or a mark caused by the first edge 30 is prevented from remaining in the gas barrier function film 12. Therefore, the destruction of the sealing function layer 18*b* is prevented.

Here, in the present embodiment, the first pressurization surface 27*a* is formed to be wider than the second pressurization surface 28*a* by 1 mm toward the inside of the opening. That is, the position of the first edge 30 is determined to be at a position further on the inside of the opening than that of the second edge 31 by 1 mm. However, the position of the first edge 30 can be changed. Specifically, deformation of the gas barrier function film 12 caused by the first edge 30 or remaining of a mark in the gas barrier function film 12 caused by the first edge is prevented by making the position of the first edge 30 be further on the inside of the opening than that of the second edge 31 by 0.5 mm or more.

<Bonding of Bending Resistant Function Film>

Figure 8:
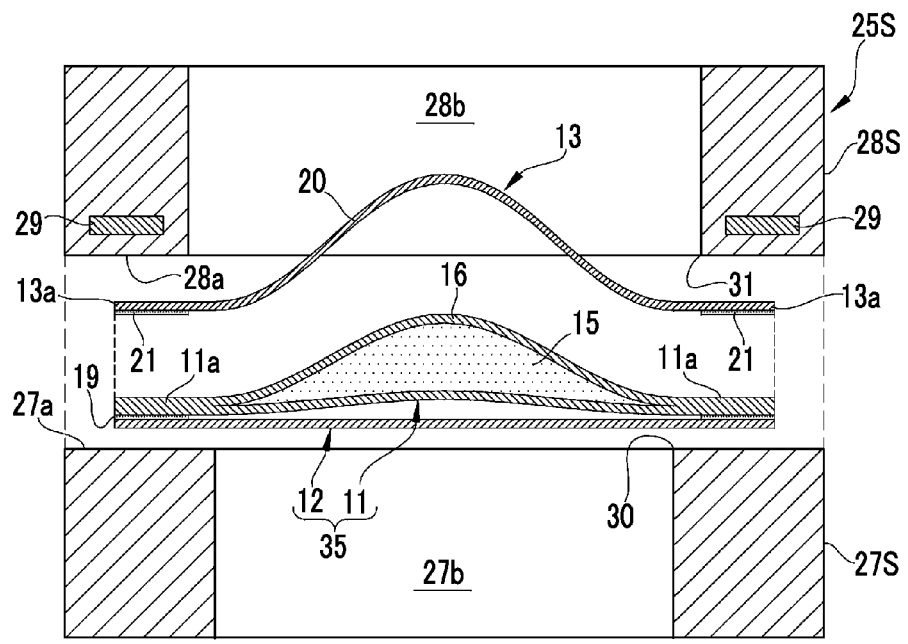
FIG. 8 is an explanatory view for illustrating a state a bending resistant function film and a bag main body is sandwiched with a first pressurization mold and a second pressurization mold to be pressed.

As shown in FIG. 8, bonding of the bending resistant function film 13 to the bag main body 11 is started after forming a bonded body 35 which is obtained by bonding the film periphery portion 12*a* of the gas barrier function film 12 to one surface side of the bag main body 11. During the bonding of this bending resistant function film 13, a set of pressurization molds 25S which is constituted of the first pressurization mold 27S and the second pressurization mold 28S is used.

The first pressurization mold 27S is a mold in which the above-described first pressurization mold 27 is set as a lower mold. The first pressurization mold 27S is formed of rubber and does not have the heating unit 29. In contrast, the second pressurization mold 28S is a mold in which the above-described second pressurization mold 28 is set as an upper mold. The second pressurization mold 28S is formed of metal and has the heating unit 29. In addition, the width W1 of one side of the first pressurization surface 27a is formed to 4 mm and the width W2 of one side of the second pressurization surface 28a is formed to 3 mm. Accordingly, the first pressurization surface 27a is formed to be wider than the second pressurization surface 28a by 1 mm toward the inside of the opening, and therefore, the first edge 30 is positioned further inside the opening than the second edge 31 by 1 mm.

First, the bonded body 35 and the bending resistant function film 13 are set in a state of overlapping each other, between the first pressurization mold 27S and the second pressurization mold 28S. At this time, the bonded body 35 is set on the surface side facing the first pressurization mold 27S and the gas barrier function film 12 is set so as to face the first pressurization mold 27S. The bending resistant function film 13 is set on the surface side facing the second pressurization mold 28S. In addition, the bending resistant function film 13 is overlapped at a predetermined bonding position on the other surface side of the bag main body 11 such that the adhesive layer 21 comes into contact with the main body periphery portion 11a of the bag main body 11. The adhesive layer 21 is provided in a frame shape on the other surface side of a pressing target portion of the film periphery portion 13a.

Figure 9:
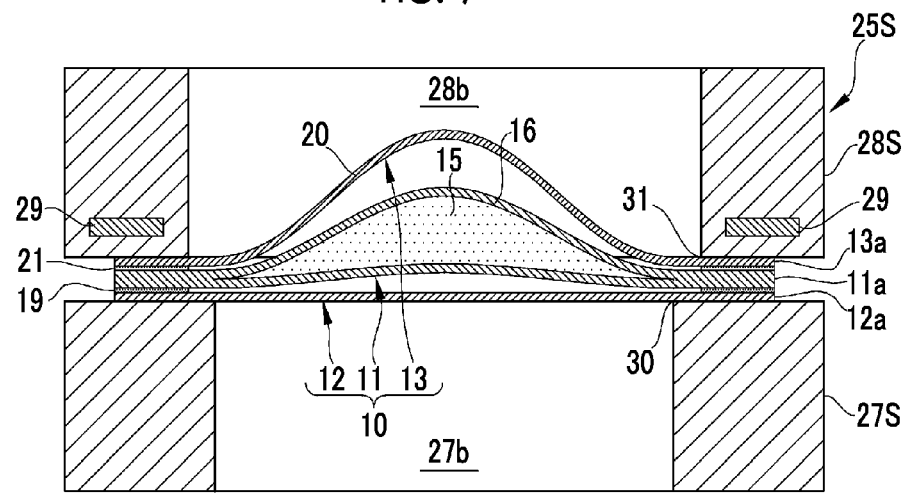
FIG. 9 is an explanatory view for illustrating a state in which the bending resistant function film and the bag main body is sandwiched with the first pressurization mold and the second pressurization mold to be pressed.

As shown in FIG. 9, the bonded body 35 and the bending resistant function film 13 are sandwiched by the first pressurization mold 27S and the second pressurization mold 28S which has been heated by the heating unit 29, to be pressed. Accordingly, the first pressurization surface 27a presses the main body periphery portion 11a to the film periphery portion 13a. In addition, the second pressurization surface 28a presses the film periphery portion 13a to the main body periphery portion 11a. Then, the adhesive layer 21 is melt through heating using the second pressurization mold 28S, and the pressing target portion of the film periphery portion 13a is bonded to the other surface side of the main body periphery portion 11a through adhering. Accordingly, a space for preventing oxygen or the like from entering the bag main body 11 is formed on the other surface side of the bag main body 11.

Even in such bonding of the bending resistant function film 13 (film periphery portion 13a), the gas barrier function film 12 which includes the sealing function layer 18b having a toughness lower than that of the bending resistant function film 13 is pressed by the first pressurization surface 27a. The first edge 30 of the first pressurization surface 27a is positioned further inside the opening than the second edge 31 of the second pressurization surface 28a. Therefore, destruction of the sealing function layer 18b of the gas barrier function film 12 is prevented similarly at the time of bonding of the above-described gas barrier function film 12.

The pressing using the first pressurization mold 27S and the second pressurization mold 28S is released after the lapse of a predetermined time for pressing. Here, the transfusion bag 10 is formed after the completion of the bonding of the bending resistant function film 13 to the other surface side of the bag main body 11.

<Action and Effect of Present Invention>

In the present invention as described above, the position of the first edge 30 of the first pressurization surface 27a which presses the gas barrier function film 12 including the sealing function layer 18b with low toughness is set to be positioned further inside the opening than the position of the second edge 31 of the second pressurization surface 28a (W1>W2). Accordingly, deformation of the gas barrier function film 12 caused by the first edge 30 during bonding (during pressing) or remaining of a mark of the first edge 30 in the gas barrier function film 12 caused by the first edge is prevented. As a result, the destruction the sealing function layer 18b of the gas barrier function film 12 is prevented, and therefore, it is possible to seal one surface side of the bag main body 11 using the gas barrier function film 12 while maintaining the sealing function of the sealing function layer 18b to its maximum.

<Another Embodiment>

Figure 10:
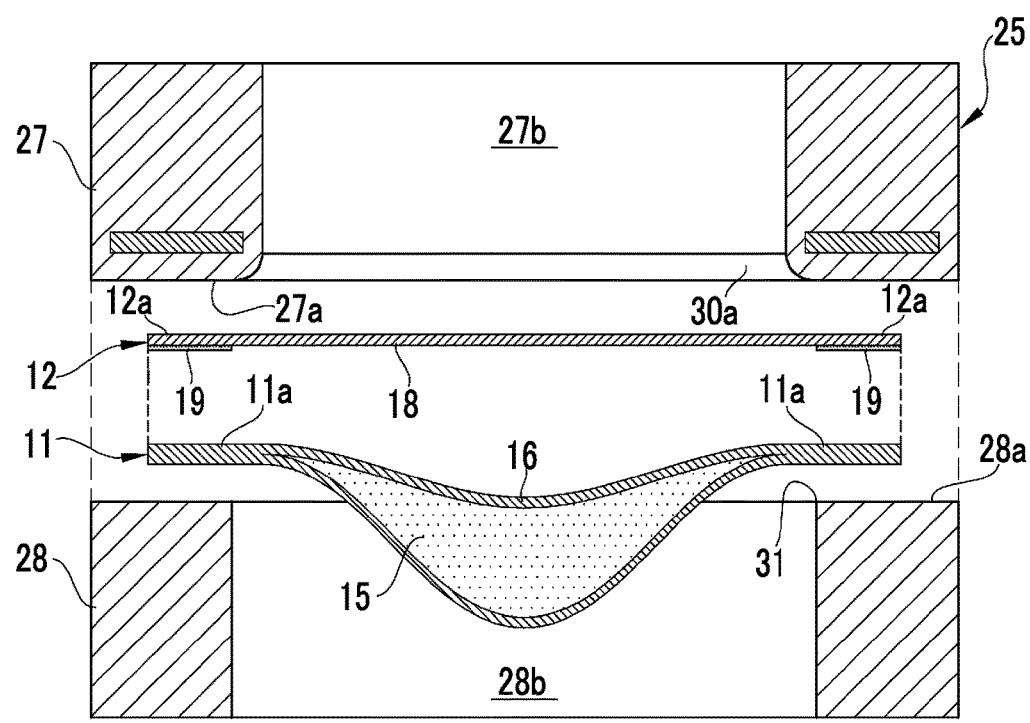
FIG. 10 is an explanatory view for illustrating another embodiment in which the first edge is chamfered.

In the above-described embodiment, the first edge 30 is formed by a corner portion formed by the first pressurization surface 27a and the first opening hole 27b. However, as shown in FIG. 10, a curved first edge 30a may be formed by, for example, chamfering the first edge 30 to R1.0 (by chamfering the first edge so as to have an arc with a radius of 1.0 mm). The force of the chamfered first edge 30a to deform the gas barrier function film 12 (film periphery portion 12a) becomes smaller than that of the first edge 30. Therefore, it is possible to more reliably prevent the destruction of the sealing function layer of the gas barrier function film 12. The chamfering of the first edge 30 is not limited R chamfering, and C chamfering (chamfering at a chamfering angle of 45°) may be performed. In addition, the second edge 31 may be chamfered without being limited to the first edge 30.

Figure 11:
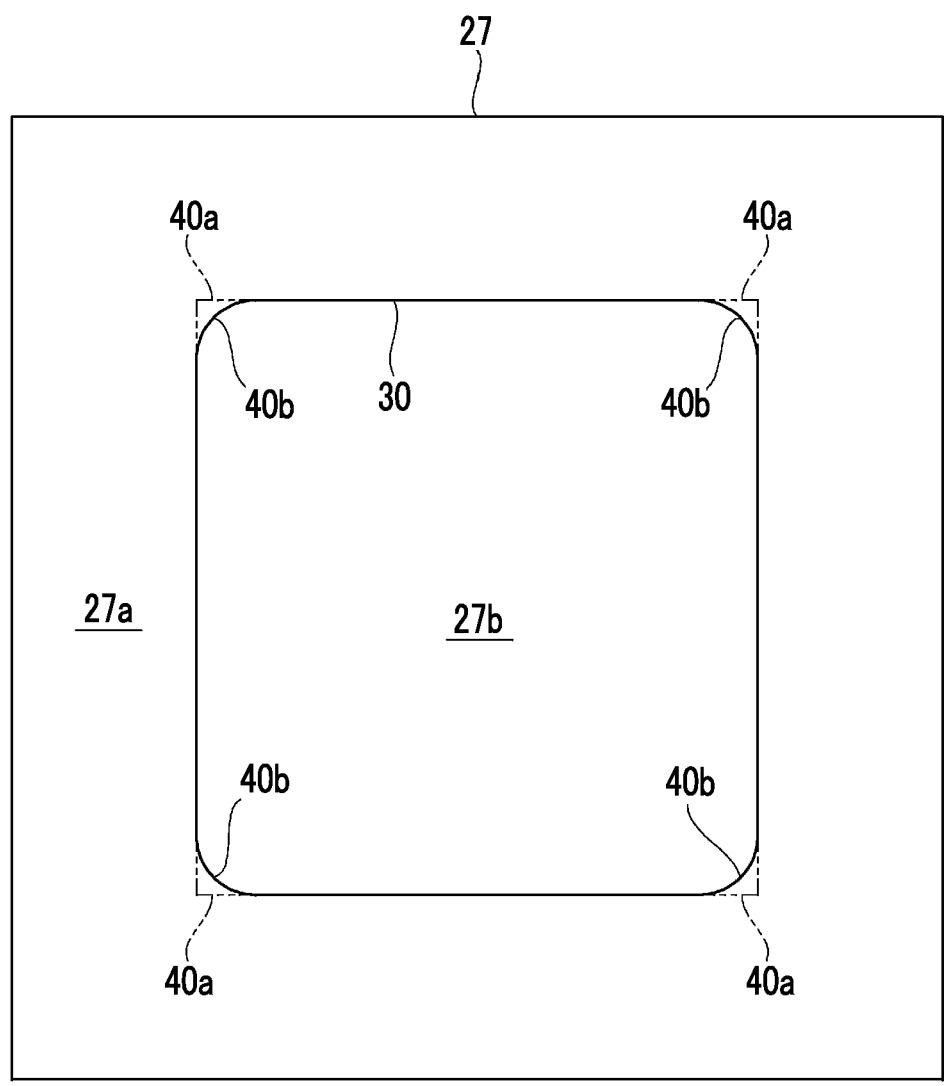
FIG. 11 is an explanatory view for illustrating still another embodiment in which a bent portion of an edge line of the first embodiment is formed in a curved shape.

In the above-described embodiment, the first opening hole 27b is formed in a rectangular shape. Therefore, a bent portion 40a (represented by a two-dot chain line) corresponding to four corner portions of the first opening hole 27b is included in the edge line of the first edge 30 which forms a contour of this first opening hole 27b as shown in FIG. 11. Accordingly, the edge line of the first edge 30 may be formed to have a smoothly connected shape. Specifically, here, the bent portion 40a of the edge line of the first edge 30 is formed as a curved unit 40b having a curved shape. Accordingly, the force of the first edge 30, at a position corresponding to the four corner portions (corner portions) of the first opening hole 27b, to deform the gas barrier function film 12 (film periphery portion 12a) becomes small. Therefore, it is possible to more reliably prevent the destruction of the sealing function layer 18b of the gas barrier function film 12. In addition, in a case where the edge line of the first edge 30 is formed to have a smoothly connected shape, the edge line of the second edge 31 which forms a contour of the second opening hole 28b is also formed to have a smoothly connected shape (not shown in the drawing). Furthermore, the embodiment shown in FIG. 10 may be combined with the embodiment shown in FIG. 11.

In the present embodiment, the gas barrier function film 12 (the same applies to the bending resistant function film 13) is bonded to the bag main body 11 through adhering. However, as shown in FIG. 12, the gas barrier function film 12 may be bonded to the bag main body 11 through welding. In the case of performing welding, a welding layer 42 is provided in the gas barrier function film 12 instead of the adhesive layer 19. As the welding method, it is possible to use a well-known welding method such as thermal welding, high frequency welding, ultrasonic wave welding, or the like.

In a case of using, for example, the thermal welding, a set of pressurization molds 25 for heat sealing is used. The first pressurization surface 27a is heated to a high temperature using the heating unit 29 while sandwiching the gas barrier function film 12 and the bag main body 11 between the first pressurization mold 27 and the second pressurization mold 28 to be pressed. Accordingly, the film periphery portion 12a and the main body periphery portion 11a are welded due to the melting of the welding layer 42.

Even in a case where the gas barrier function film 12 is bonded to the bag main body 11 through welding in this manner, similarly to the above-described bonding through adhering, the position of the first edge 30 of the first pressurization mold 27 is positioned further inside the opening than the position of the second edge 31 of the second pressurization mold 28. For this reason, destruction of the sealing function layer 18b of the gas barrier function film 12 caused by the pressing using the first pressurization mold 27 and the second pressurization mold 28 is prevented. The bending resistant function film 13 can also be bonded to the bag main body 11 through welding.

Figure 13:
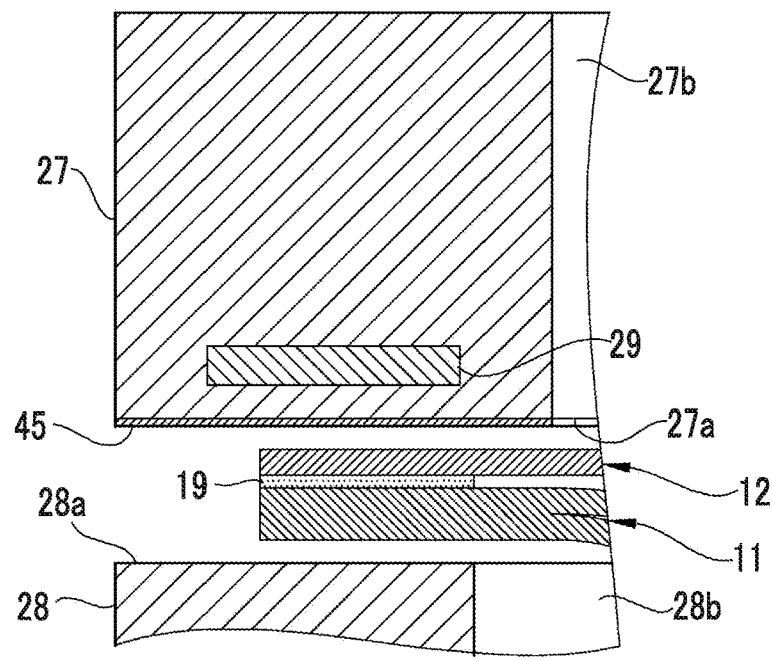
FIG. 13 is an explanatory view for illustrating still another embodiment in which a first pressurization surface has releasability with respect to a gas barrier function film due to surface treatment.

In the present embodiment, the first pressurization surface 27a does not have releasability with respect to the gas barrier function film 12. However, for example, as shown in FIG. 13, a surface treatment layer 45 which has releasability with respect to the gas barrier function film 12 may be formed by performing surface treatment on the first pressurization surface 27a. Accordingly, the gas barrier function film 12 can be easily peeled from the first pressurization surface 27a after the pressing of the gas barrier function film 12 performed by the first pressurization surface 27a. For example, baking may be performed as a type of the surface treatment which is performed on the first pressurization surface 27a.

Figure 14:
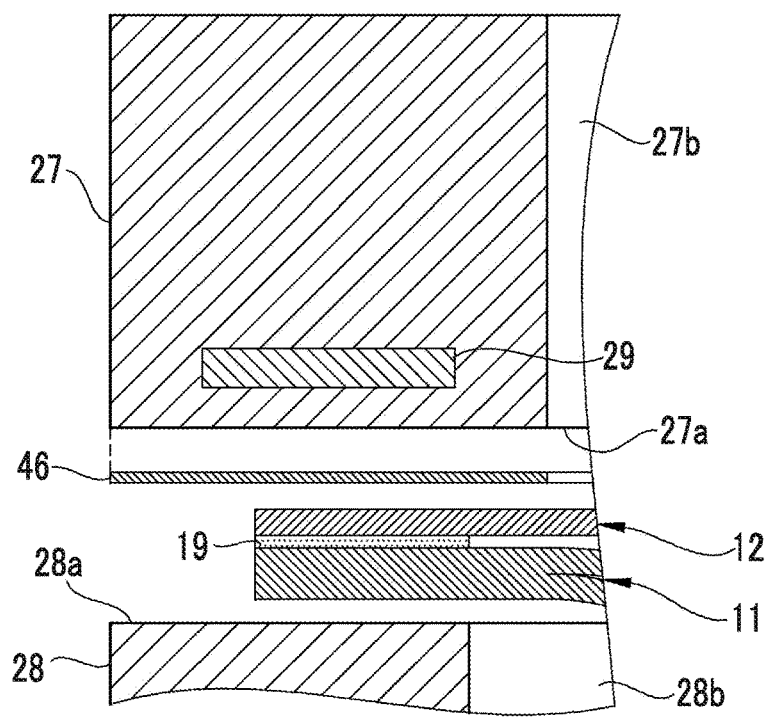
FIG. 14 is an explanatory view for illustrating still another embodiment in which tape is pasted to a first pressurization surface.

In addition, a tape 46 may be, for example, stuck to the first pressurization surface 27a as shown in FIG. 14, instead of performing surface treatment on the first pressurization surface 27a. Accordingly, it is possible to secure the releasability of the first pressurization surface 27a with respect to the gas barrier function film 12. Furthermore, although it is not shown in the drawing, a sheet may be disposed between the first pressurization surface 27a and the gas barrier function film 12 and the gas barrier function film 12 may be pressed by the first pressurization surface 27a in a state in which this sheet is sandwiched therebetween. Even in this case, it is possible to secure the releasability of the first pressurization surface 27a with respect to the gas barrier function film 12.

It is also possible to secure the releasability of the second pressurization mold 28 (second pressurization surface 28a) with respect to the bag main body 11 or the bending resistant function film 13 through the method (the surface treatment, the sticking of tape, or the arrangement of a sheet) shown in FIG. 13 or 14.

Figure 15:
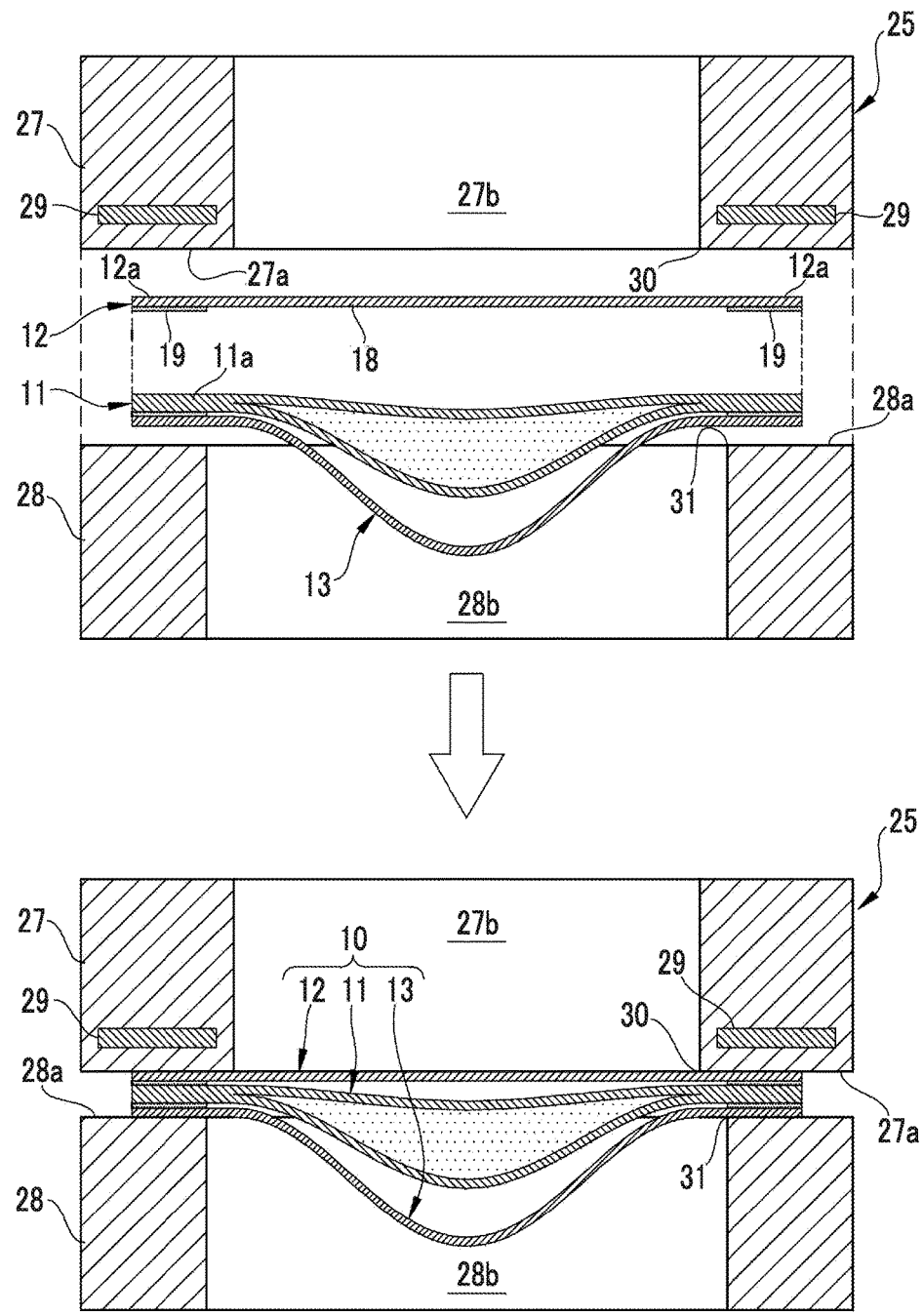
FIG. 15 is an explanatory view for illustrating still another embodiment in which bonding of a gas barrier function film to a bag main body is performed after bonding of a bending resistant function film to the bag main body.

In the above-described embodiment, after bonding the gas barrier function film 12 to one surface side of the bag main body 11, the bending resistant function film 13 is bonded to the other surface side of the bag main body 11. However, the order of the bonding may be reversed. That is, as shown in FIG. 15, after first bonding the bending resistant function film 13 to the other surface side of the bag main body 11, the gas barrier function film 12 may be bonded to one surface side of the bag main body 11.

In the case of reversing the order of the bonding in this manner, the bonding is performed such that the gas barrier function film 12 is prevented from more swelling than the bending resistant function film 13. That is, the bending resistant function film 13 is set to be in a state of more swelling than the gas barrier function film 12. Accordingly, when bonding the gas barrier function film 12 to the bag main body 11, it is possible to secure a volume of the content (transfusion 15) by making the bending resistant function film 13 to swell. As a result, it is possible to bond the gas barrier function film 12 to the bag main body 11 without destruction of the sealing function layer 18b.

In the above-described embodiment, the first pressurization mold 27 is formed of metal and the second pressurization mold 28 is formed of a rubber material. However, at least one of the first pressurization mold 27 and the second pressurization mold 28 may be formed of a metal material, a rubber material, a resin material, a ceramic material, wood, or the like. At least one of the first pressurization mold 27S and the second pressurization mold 28S may also be formed of a metal material, a rubber material, a resin material, a ceramic material, wood, or the like.

In the above-described embodiment, as an example, the gas barrier function film 12 has been described as a film of the present invention. However, a resin film having various functions (including a case of having a plurality of functions) such as steam barrier properties in addition to the gas barrier properties may be used. In addition, various resin films having higher bending properties than the gas barrier function film 12 may be used as the bending resistant function film 13.

In the above-described embodiment, the first pressurization surface 27a and the second pressurization surface 28a (the first opening hole 27b and the second opening hole 28b) are formed in a rectangular shape, but the shapes thereof may be appropriately changed to the shape of the liquid medicine chamber 16.

In the above-described embodiment, four sides of each of the bag main body 11 and the gas barrier function film 12 (bending resistant function film 13) are sealed by the frame-like first pressurization surface 27a and the frame-like second pressurization surface 28a. However, for example, two sides or three sides thereof may be sealed. In this case, the first pressurization surface 27a and the second pressurization surface 28a (the first opening hole 27b and the second opening hole 28b) may be formed in a shape corresponding to the two-side sealing, three-side sealing, or the like.

In the above-described embodiment, the gas barrier function film 12 or the bending resistant function film 13 is bonded to the bag main body 11. However, the gas barrier function film 12 or the like may be first bonded to a flexible resin film before being formed on the bag main body 11.

In the above-described embodiment, the case of bonding the gas barrier function film 12 to the bag main body 11 of the transfusion bag 10 has been described as an example. However, it is also possible to apply the present invention to the bonding method and the bonding device for bonding various films including a layer with low toughness to various bonding target objects in addition to the transfusion bag 10 of a packaging container or the like containing various kinds of liquid medicines, powder medicines, food, powder (sugar or the like) which is weak to humidity, and an inspection chip which detects specific gas.

EXPLANATION OF REFERENCES

10 . . . transfusion bag, 11 . . . bag main body, 12 . . . gas barrier function film, 13 . . . bending resistant function film, 25, 25S . . . a set of pressurization molds, 27, 27S . . . first pressurization mold, 27a . . . first pressurization surface, 27b . . . first opening hole, 28, 28S . . . second pressurization mold, 28a . . . second pressurization surface, 28b . . . second opening hole, 30 . . . first edge, 31 . . . second edge

What is claimed is:

1. A bonding method for bonding a pressing target portion of a gas barrier function film to a film-made pack by disposing the film-made pack and the gas barrier function film, which includes a sealing function layer having a lower toughness than the film-made pack between a set of pressurization molds comprising first and second pressurization molds, which each have frame shaped pressurization surfaces disposed so as to face each other and in which an opening hole is formed in the frame shaped pressurization surface of the first pressurization mold and an opening hole is formed in the frame shaped pressurization surface of the second pressurization mold, the method comprising:

bonding the pressing target portion to the film-made pack using the set of pressurization molds, wherein the first pressurization mold has a configuration in which a first edge on the opening hole side of the pressurization surface of the first pressurization mold faces the gas barrier function film and is positioned further inside the opening hole of the first pressurization mold than a second edge on the opening hole side of the pressurization surface of the second pressurization mold which faces the film-made pack, wherein the first edge of the first pressurization mold is chamfered, and the method further including positioning the film-made pack within the opening hole of the second pressurization mold.

2. The bonding method according to claim 1, wherein an adhesive layer is formed on a surface side of the pressing target portion facing the film-made pack, and wherein the set of pressurization molds bonds the pressing target portion to the film-made pack through the adhesive layer.

3. The bonding method according to claim 1, wherein the set of pressurization molds bonds the pressing target portion to the film-made pack through welding.

4. The bonding method according to claim 1, further comprising:

bonding the pressing target portion of the film to one surface side of the film-made pack, and then, bonding a pressing target portion of a bending resistant function film, which is positioned on the other surface side of the film-made pack and has higher bending resistance than the gas barrier function film, to the film-made pack by disposing the film-made pack and the bending resistant function film between the set of pressurization molds, and sandwiching the film-made pack and the bending resistant function film with the set of pressurization molds to press the gas barrier function film on the one surface side of the film-made pack using the first pressurization mold and to press the bending resistant function film using the second pressurization mold.

5. The bonding method according to claim 1, further comprising:

bonding the pressing target portion of the film to one surface side of the film-made pack using the set of pressurization molds in a state in which the gas barrier function film is suppressed not to swell more than a bending resistant function film having higher bending resistance than the gas barrier function film, after bonding the bending resistant function film to the other surface side of the film-made pack.

6. The bonding method according to claim 1, wherein at least one of the first pressurization mold and the second pressurization mold is formed of any of metal, a rubber material, a resin material, a ceramic material, and wood.

7. The bonding method according to claim 1, wherein at least the first pressurization mold performs pressing of the gas barrier function film using the pressurization surface having releasability with respect to the gas barrier function film.

8. The bonding method according to claim 1, wherein the pressurization surface of at least the first pressurization mold presses the gas barrier function film through tape which is stuck to the pressurization surface or a sheet provided between the pressurization surface and the gas barrier function film.

9. The bonding method according to claim 1, wherein an edge line of the first edge which forms a contour of the opening hole of the first pressurization mold is formed to have a smoothly connected shape and an edge line of the second edge which forms a contour of the opening hole of the second pressurization mold is formed to have a smoothly connected shape.

10. The bonding method according to claim 1, wherein the film-made pack and the gas barrier function film are sandwiched with the set of pressurization molds, which have the pressurization surfaces formed in a frame shape and the opening holes which are surrounded by the pressurization surfaces, to be pressed.

11. The method of claim 1 wherein the film-made pack is a transfusion bag.

12. The method of claim 11, wherein the bonding prevents damage to the sealing function layer.

13. The method of claim 1, wherein the opening hole of the first pressurization mold has rounded corners.

14. The method of claim 1, wherein the chamfered edge is arranged to face the second edge of the second pressurization mold.

* * * * *